(12) United States Patent
Smola et al.

(10) Patent No.: US 6,442,626 B1
(45) Date of Patent: Aug. 27, 2002

(54) COPY PROTECTION SYSTEM ONLY AUTHORIZES THE USE OF DATA IF PROPER CORRELATION EXISTS BETWEEN THE STORAGE MEDIUM AND THE USEFUL DATA

(75) Inventors: Michael Smola, München; Dietmar Zaig, Holzkirchen, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/221,786

(22) Filed: Dec. 28, 1998

(51) Int. Cl.[7] .................. G06F 3/00; G06F 12/14
(52) U.S. Cl. .................................. 710/36; 713/200
(58) Field of Search .................... 369/94; 380/30, 380/54; 710/15, 36; 386/94; 713/200

(56) References Cited

U.S. PATENT DOCUMENTS

| | | | | |
|---|---|---|---|---|
| 4,405,829 A | * | 9/1983 | Rivest et al. ................. | 380/30 |
| 5,265,240 A | * | 11/1993 | Galbraith et al. ............. | 710/15 |
| 5,541,994 A | * | 7/1996 | Tomko et al. ................ | 380/30 |
| 5,579,120 A | * | 11/1996 | Oguro ......................... | 386/94 |
| 5,793,871 A | * | 8/1998 | Jackson ....................... | 380/54 |
| 5,799,088 A | * | 8/1998 | Raike .......................... | 380/30 |
| 5,822,291 A | * | 10/1998 | Brindze et al. ............... | 369/94 |

* cited by examiner

*Primary Examiner*—Le Hien Luu
(74) *Attorney, Agent, or Firm*—Laurence A. Greenberg; Werner H. Stemer; Ralph E. Locher

(57) ABSTRACT

The copy protection system and method combines the features of a conventional electronic data carrier with a dongle to form a secure storage medium. The storage medium has a unique identification, such as a device serial number. The host transmits a challenge signal to the storage medium and then checks the response received from the storage medium for a proper correlation between the useful data and the storage medium. A mismatch indicates that the data is present on a bootleg carrier instead of on its authorized carrier. Therefore, if the response signal in the challenge-response process does not correspond to the expected setpoint response, then the data are not authorized for processing.

9 Claims, 1 Drawing Sheet

COPY PROTECTION SYSTEM ONLY AUTHORIZES THE USE OF DATA IF PROPER CORRELATION EXISTS BETWEEN THE STORAGE MEDIUM AND THE USEFUL DATA

BACKGROUND OF THE INVENTION

Field of the Invention

The invention relates to software piracy prevention. More specifically, the invention pertains to a novel method of protecting digital data against unauthorized copying and use.

Digital media have become popular carriers for various types of data information. Computer software and audio information, for instance, are widely available on optical compact disks (CDs). Recently, the digital audio tape (DAT) has gained in distribution share. The CD and the DAT utilize a common standard for the digital recording of data, software, images, and audio. Additional media, such as multimedia compact disks (MCD), digital video disks (DVD), super density disks, and the like, are making considerable gains in the software and data distribution market.

The substantially superior quality of the digital format as compared to the analog format renders the former much more prone to unauthorized copying and pirating. Copying of a digital data stream—whether compressed, uncompressed, encrypted or non-encrypted—typically does not lead to any appreciable loss of quality in the data. Digital copying thus is essentially unlimited in terms of multi-generation copying. Analog data with its substantial signal to noise ratio, on the other hand, is naturally limited in terms of multi-generation and mass copying.

The advent of the recent popularity in the digital format has also brought about a slew of copy protection systems and methods. These are generally grouped in categories such as encryption, copy protection, and content extensions.

Prior art methods of preventing unauthorized copying of copyrighted and protection-worthy data do not attain a particularly high degree of protection.

Encryption, which is used in the digital and the analog format, essentially scrambles the information. The data stream can be made usable only with the proper key. It has been found that encryption is usually easy to crack. Once the key has been found by a copy pirate, the information may be freely multiplied without encryption.

Software copy protection was widely used during the early days of the personal computer. However, software manufacturers essentially stopped copy protection once it was found that, on the one hand, virtually all copy protection codes would be quickly broken by hackers and, on the other hand, the development of new types of copy protection was becoming prohibitively expensive. Furthermore, non-protected programs soon turned out to become so widely used—even though many copies were unauthorized—that the additional sales could largely make up for the bootleg losses.

One hybrid solution is partly software and partly hardware based. In such systems, the identification features of the storage media are used, in order to determine their existence in the system. If that feature is also present in the data to be protected, then it is assumed on the basis of the binder connection between the data and the storage medium, that the data have been read from or used by just that medium. An example is a copy protection system in which the identification number of compact flash cards are used (company Liquid Audio). That protection is easily cracked in so far as the feature ID of the memory card can be easily manipulated in the system.

An established hardware-based protection system uses a special hardware circuit (e.g. at the parallel port of a PC) for processing an authentification between the data and the circuit. The relevant data can be used only in the presence of that hardware module. Such a hardware module for copy protection is often referred to as a dongle. That solution has several disadvantages. On the one hand, the module must be usable on all platforms on which the memory card is to be used. This is very difficult and hardly possible in heterogeneous user environments (e.g. PC, PDA, low-cost audio player, etc.). The target system, furthermore, must include a corresponding interface. In PCs this is typically the printer interface. Such an interface, however, is not typically present in low-cost applications (e.g. portable tape players and disc players).

On the other hand, the data can be copied and used without any problem when the hardware module is correspondingly manipulated. It is also understood that copy protection and the prevention of pirating in general is not typically in the consumer's interest.

Several popular programs use a system in which an installation key is delivered with the original program packaging of the data carrier (e.g. CD or floppy). The installation key is required before the program data can be installed on a PC. It is thereby easily possible to copy the key together with the data content of the CD any number of times and to thus distribute and bring into circulation any number of pirated copies.

Another established protection mechanism comprises preventing copying in general with the aid of special protocol conventions. Such protocols have been established, for instance, in the audio application of DAT recorders. As noted above, CD and DAT data formats are substantially identical and, accordingly, multi-generation copying would be possible. In the DAT system, therefore, the CD to be copied is queried for special copy protection information and, if the protection is activated, the DAT recorder is not authorized for copying. Such a method, however, is disadvantageous in that a high degree of discipline with regard to the target devices is necessary. Special anti-copy circuitry must be included in the recorder. Such a system is known as the serial copy management system (SCMS). The end user is not generally interested in those measures. It has been shown that the discipline is not always maintained. In particular, black boxes for filtering the copy-prohibit instruction from the digital signal are widely available. Recently, also, the use of modern PCs makes it possible to easily manipulate such mechanisms and, in the end, to circumvent them.

SUMMARY OF THE INVENTION

It is accordingly an object of the invention to provide a copy protection method and system, which overcomes the above-mentioned disadvantages of the heretofore-known devices and methods of this general type and which safely protects against copying of protected data from one medium onto an equivalent storage medium and the identical use of the copied data as the data on the original storage medium. It is a particular object to prevent the reading-out of information while retaining existing protection mechanisms and the subsequent copying of the deciphered data. Finally, it is a specific object of the novel method to bind the data to be protected with the carrier medium and to render free duplication of the data onto other carrier media impossible.

With the foregoing and other objects in view there is provided, in accordance with the invention, a method of preventing unauthorized copying of data by authorizing data and a storage medium. The method comprises the following steps:

provided a storage medium with useful data and a unique identification;

transmitting a challenge signal from a host to the storage medium;

generating a response signal in the storage medium and transmitting the response signal to the host; and determining whether a proper correlation exists between the storage medium and the useful data, and authorizing the data for use in the host if the proper correlation exists.

In accordance with an added feature of the invention, a random number is generated and incorporated in the challenge signal.

In accordance with another feature of the invention, the useful data comprise a software program and the host is a software processor, and the method further comprises copying a plain copy of the software program from the storage medium to the host prior to the transmitting step.

In accordance with a further feature of the invention, a further challenge signal is transmitted from the storage medium to the host, a response to the further challenge signal is generated in the host, the response is transmitted to the storage medium, and the response is authorized in the storage medium if the response corresponds to a setpoint response.

With the above and other objects in view there is also provided, in accordance with the invention, a copy protection system, comprising:

a storage medium containing useful data and having a unique identification;

a host adapted to receive from the storage medium a transmission with the useful data, the host being programmed to:

generate and transmit a challenge signal to the storage medium;

process a response signal received from the storage medium; and determine whether a proper correlation exists between the storage medium and the useful data, and authorize the data for use in the host if the proper correlation exists.

In accordance with again a further feature of the invention, the storage medium is a multimedia card and the host is a computer.

In accordance with a concomitant feature of the invention, the host includes a random number generator and a random number generated in the host is included in the challenge signal. In addition, or in the alternative, the storage medium includes a random number generator.

Other features which are considered as characteristic for the invention are set forth in the appended claims.

Although the invention is illustrated and described herein as embodied in a copy protection system and method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
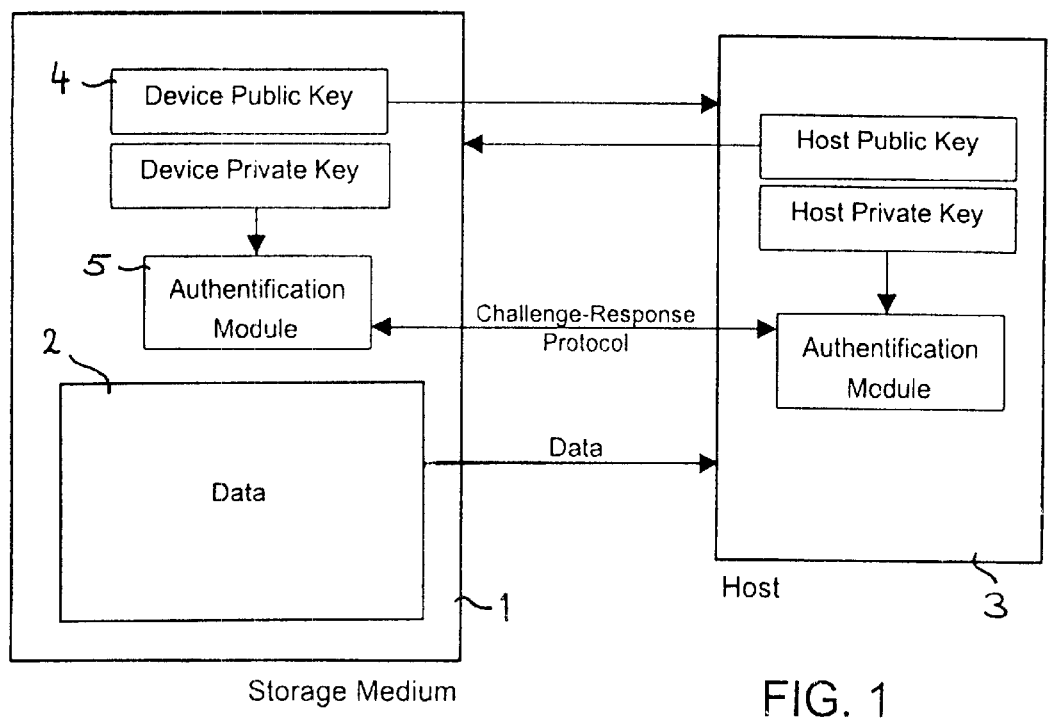
FIG. 1 is a schematic showing data flow between a storage medium and a host.

Referring now to the figures of the drawing in detail and first, particularly, to FIG. 1 thereof, there is seen a system diagram where a storage medium 1 contains useful data 2. The useful data 2 is the data to be protected from pirating. The storage medium 1 may, for instance, be a multimedia card or a smart card. A host 3 receives the data from the storage medium 1 and processes the data according to the pertinent instructions.

The invention, in general terms, resides in the authorization of the useful data with the aid of the storage medium 1 on which the data 2 are stored. The data are thereby present in such a form that they contain information about the storage medium 1. It is a prerequisite that the storage medium 1 is individually identified.

When the data are read and used, the host 3 transmits a challenge signal to the storage medium 1 and then checks on the basis of the response whether there exists a correlation between the storage medium 1 and the data 2. It is thereby possible to use any conventional challenge-response method. One possibility is to use a public key process in which the storage medium 1—also referred to as a device—possesses a unique public key 4. The host 3 dynamically generates a random number and transmits the random number to the storage medium 1 together with the host's public key. In response, the storage medium 1 thereupon generates from that number a definitive answer and transmits the answer to the host 3.

Both the generation of the random number and the check may be performed with a module that is provided on the host with the aid of the data to be used, or with the data itself (in the form of a executable program).

Depending on the desired safety level, it is also possible to employ more complicated challenge-response processes as they are known from the pertinent literature (in which, for instance, both the storage medium and the host generate random numbers). Reference is had, in this regard to our commonly assigned, copending application Ser. No. 09/167, 273, which is herewith incorporated by reference.

If the response received by the host 3 does not correspond to the setpoint response (the "correct" response), the host may decline to use the data (e.g. the processing of the program may be aborted).

Checking the identification feature of the medium may for instance be a part of the software that is stored on the medium 1 itself. Copying the content of the medium is thus useless since the data cannot be used unless the corresponding storage medium 1 is physically present in the host 3. This process therefore allows close coupling of the usability of the software with the associated electronic data storage medium, which contains the matching dongle hardware.

The invention thus resides in the combination of a conventional electronic storage medium or data carrier (e.g. multimedia card) with a security controller (dongle) in a novel, secure storage medium. The inventive concept further lies in the use of an authentification process in checking for the use-authorization of the data 2 that are present on the storage medium 1. The storage medium 1 thereby possesses an authentification module 5 with the aid of which the authentification can be processed. The combination of the two characteristics in one device reduces the system costs (only one interface is required) on the one hand, and it simultaneously increases the protection against the unauthorized use of the useful data 2 that are to be protected.

Figure 2:
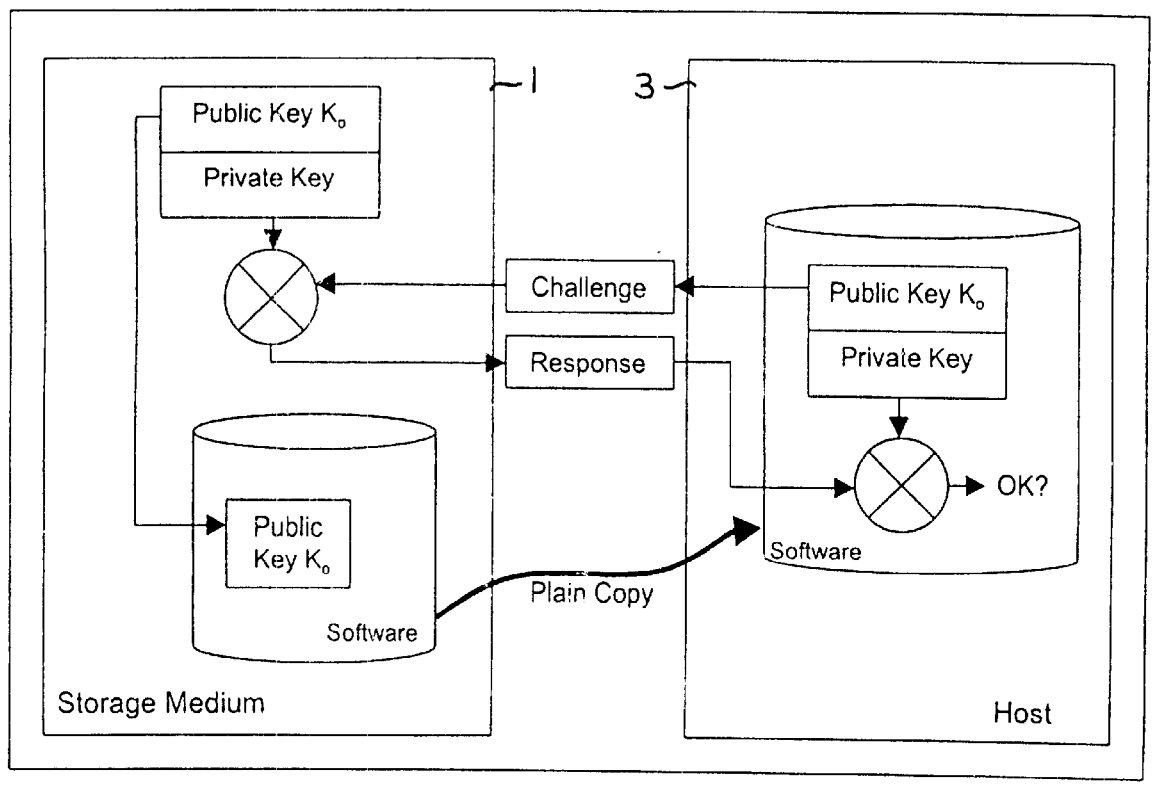
FIG. 2 is a schematic block diagram of a software-based exemplary embodiment of the invention.

Referring now to FIG. 2, there is shown a specific embodiment in which the concept of the invention is utilized. The program transmits random numbers to the storage medium 1 and then compares its response with the setpoint response. The program is first copied from the storage medium into the host in unmodified form. In order to improve security, it is also possible to use two-sided challenge-response processes.

We claim:

1. A method of authorizing data and a storage medium, which comprises:

providing a storage medium with useful data and a unique identification, the useful data being present in such a form that the useful data contain information about the storage medium;

transmitting a challenge signal from a host to the storage medium;

generating a response signal in the storage medium and transmitting the response signal to the host; and determining whether a proper correlation exists between the storage medium and the useful data, and authorizing the data for use in the host if the proper correlation exists.

2. The method according to claim 1, which further comprises generating a random number and incorporating the random number in the challenge signal.

3. The method according to claim 1, wherein the useful data comprise a software program and the host is a software processor, and wherein the method comprises copying a plain copy of the software program from the storage medium to the host prior to the transmitting step.

4. The method according to claim 1, which further comprises transmitting a further challenge signal from the storage medium to the host, generating a response to the further challenge signal in the host, transmitting the response to the storage medium, and authorizing the response in the storage medium if the response corresponds to a setpoint response.

5. The method according to claim 1, wherein the storage medium is a multimedia card and the host is a computer.

6. A copy protection system, comprising:

a storage medium containing useful data and having a unique identification, the useful data being present in such a form that the useful data contain information about the storage medium;

a host adapted to receive from said storage medium a transmission with the useful data, said host being programmed to:

generate and transmit a challenge signal to said storage medium;

process a response signal received from said storage medium; and determine whether a proper correlation exists between said storage medium and the useful data, and authorize the data for use in the host if the proper correlation exists.

7. The system according to claim 6, wherein said storage medium is a multimedia card.

8. The system according to claim 6, wherein said host includes a random number generator and a random number generated in said host is included in said challenge signal.

9. The system according to claim 6, wherein said storage medium includes a random number generator.

* * * * *